(12) United States Patent
Wittmer et al.

(10) Patent No.: US 8,762,598 B2
(45) Date of Patent: Jun. 24, 2014

(54) ARRANGEMENT WITH A SUPERORDINATED CONTROL UNIT AND AT LEAST ONE INTELLIGENT FIELD DEVICE CONNECTABLE WITH THE CONTROL UNIT

(75) Inventors: Detlev Wittmer, Maulbronn (DE); Jörg Giebson, Potsdarn (DE); Stephan Buschnakowski, Chemnitz (DE); Stefan Pilz, Bad Lausick (DE)

(73) Assignee: Endress + Hauser Conducta Gesellschaft für Mess- und Regeltechnik mbH + Co. KG, Gerlingen (DE)

( * ) Notice: Subject to any disclaimer, the term of this patent is extended or adjusted under 35 U.S.C. 154(b) by 131 days.

(21) Appl. No.: 12/971,133

(22) Filed: Dec. 17, 2010

(65) Prior Publication Data

US 2011/0153040 A1 Jun. 23, 2011

(30) Foreign Application Priority Data

Dec. 23, 2009 (DE) .......................... 10 2009 055 247

(51) Int. Cl.
*G06F 3/00* (2006.01)
*G06F 5/00* (2006.01)
*G06F 13/38* (2006.01)

(52) U.S. Cl.
USPC .................................. 710/36; 710/15; 710/65

(58) Field of Classification Search
None
See application file for complete search history.

(56) References Cited

U.S. PATENT DOCUMENTS

| | | | |
|---|---|---|---|
| 6,032,203 A * | 2/2000 | Heidhues | 710/11 |
| 6,275,881 B1 | 8/2001 | Doege | |
| 8,279,038 B2 | 10/2012 | Lefebvre | |
| 2007/0174202 A1 | 7/2007 | Dorsch | |
| 2009/0013107 A1* | 1/2009 | Wittmer | 710/69 |
| 2009/0094601 A1 | 4/2009 | Vstovskiy | |
| 2009/0193169 A9* | 7/2009 | Guenter et al. | 710/305 |
| 2010/0217967 A1 | 8/2010 | Viswanathan | |

FOREIGN PATENT DOCUMENTS

| | | |
|---|---|---|
| DE | 19512372 A1 | 10/1996 |
| DE | 29706969 U1 | 8/1997 |

(Continued)

OTHER PUBLICATIONS

AVM Computersysteme Vertriebs Gmbh, Fritz!WLAN USB Stick, 2009, Berlin.

*Primary Examiner* — Zachary K Huson
(74) *Attorney, Agent, or Firm* — Bacon & Thomas, PLLC

(57) ABSTRACT

An arrangement with a superordinated control unit and at least one intelligent field device connectable with the control unit, wherein associated with the control unit is at least one interface with a connection element for accommodating a corresponding connection counterpart. The connection counterpart is associable with an interface module, wherein associated with the interface module is a software protection system securing accessing of the field device. The interface module permits communication between the corresponding field device and the superordinated control unit, wherein associated with the superordinated control unit is a software-protected processing program for the field device, and wherein the processing program is started or enabled via the software protection system, when the connection counterpart of the interface module of the field device is connected with the connection element of the control unit.

11 Claims, 2 Drawing Sheets

(56) References Cited

FOREIGN PATENT DOCUMENTS

| | | |
|---|---|---|
| DE | 19646219 A1 | 12/1997 |
| DE | 19749853 A1 | 5/1999 |
| DE | 10330191 A1 | 2/2005 |
| DE | 102004020393 A1 | 11/2005 |
| DE | 102005002472 A1 | 7/2006 |
| DE | 102005029654 | 12/2006 |
| DE | 102005053332 | 5/2007 |
| EP | 1093039 A1 | 4/2001 |
| EP | 2189899 A1 | 5/2010 |
| EP | 2211244 A2 | 7/2010 |
| GB | 2399192 A | 9/2004 |
| GB | 2452167 A | 2/2009 |
| WO | WO 2005/101145 A1 | 10/2005 |
| WO | WO 2005/103851 A1 | 11/2005 |
| WO | WO 2007/038872 A1 | 4/2007 |

\* cited by examiner

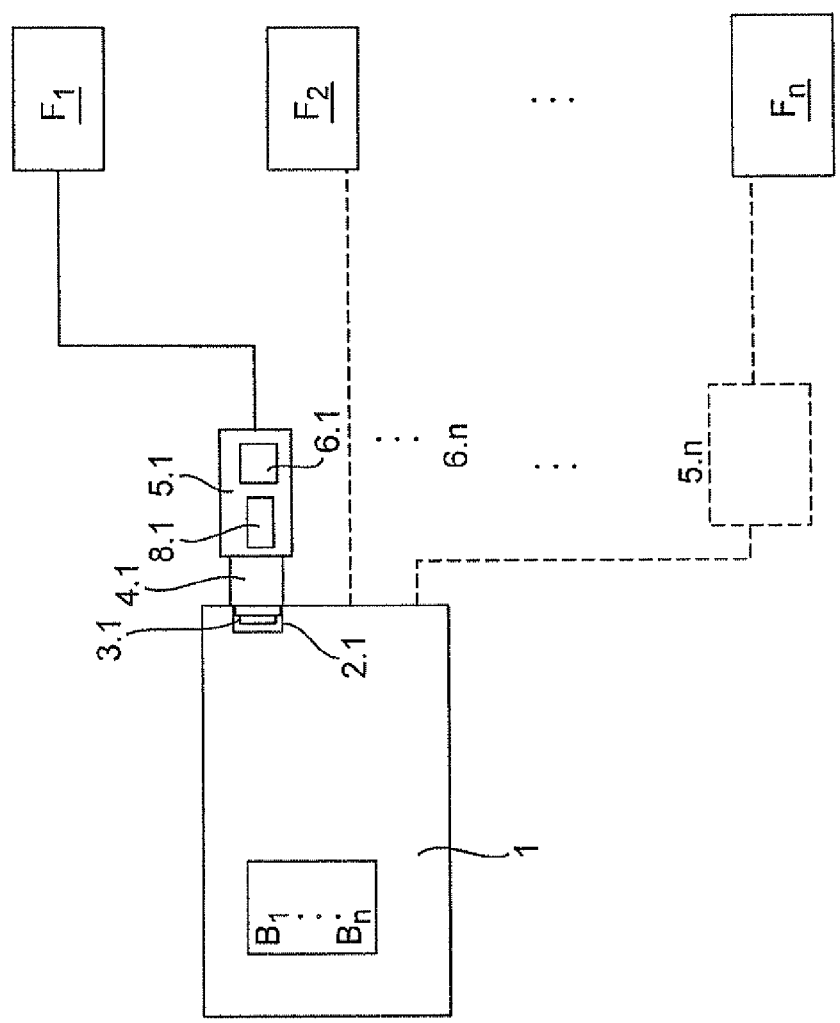

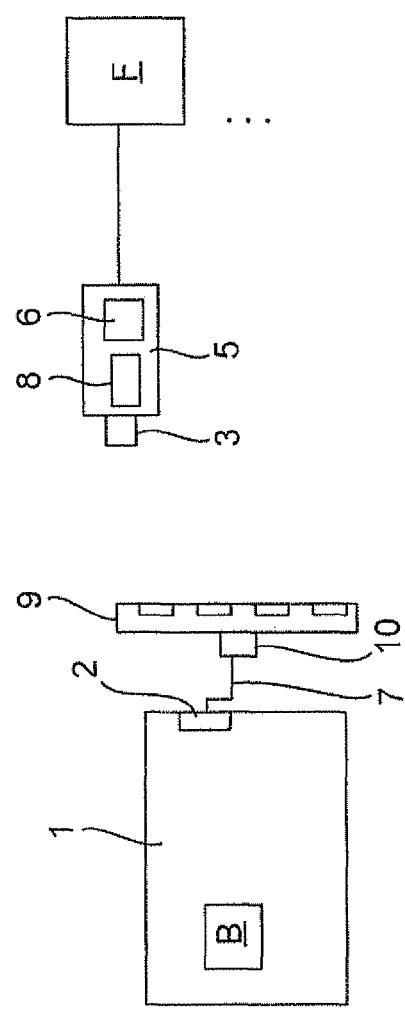

ARRANGEMENT WITH A SUPERORDINATED CONTROL UNIT AND AT LEAST ONE INTELLIGENT FIELD DEVICE CONNECTABLE WITH THE CONTROL UNIT

TECHNICAL FIELD

The invention relates to an arrangement with a superordinated control unit and at least one intelligent field device connectable with the control unit.

BACKGROUND DISCUSSION

Such arrangements are best known in automation technology, especially in process automation technology. In such case, field devices are often applied, which serve for registering and/or influencing process variables. Serving for registering process variables are sensors, such as, for example, fill level measuring devices, flow measuring devices, pressure and temperature measuring devices, pH-measuring devices and pH-redox potential measuring devices, conductivity measuring devices, etc., which register the corresponding process variables, fill level, flow, pressure, temperature, pH-value, or conductivity. Serving for influencing process variables are actuators, such as, for example, valves or pumps, via which the flow of a liquid in a pipeline section or the fill level in a container can be changed. In principle, all devices which are applied near to the process and deliver or work with process relevant information are referred to as field devices. Besides the earlier named sensors and actuators, such units, which are participants in a fieldbus system and which are capable of communication with the superordinated units, such as, for example, remote I/Os, gateways, linking devices and radio adapters, are also generally referred to as field devices. A large number of the above mentioned field devices are produced and sold by the Endress+Hauser Group.

In modern industrial plants, field devices are, as a rule, connected, via bus systems, such as Profibus®, FOUNDATION Fieldbus®, HART®, etc., with superordinated units. Normally, the superordinated units are control systems or control units, such as, for example, a PLC (programmable logic controller). The superordinated units serve, among other things, for process control, process visualizing, process monitoring as well as for start-up of the field devices. The measured values registered by the field devices—here especially sensors—are transmitted via the particular bus system to one—or, in given cases, a number of—superordinated unit/units. Along with this, for the purpose of configuring, parametering, or diagnosis of field devices or for the purpose of operating of actuators, data transmission occurs also from the superordinated unit via the bus system to the field devices.

Besides hardwired data transmission between the field devices and the superordinated unit, wireless data transmission, or the radio transmission of data, is becoming always more important. Especially in the bus systems, Profibus®, FOUNDATION Fieldbus® and HART®, wireless data transmission via radio is specified. Additionally, radio or wireless networks for sensors are specified in greater detail in the standard IEEE 802.15.4. For implementing wireless data transmission, newer field devices, especially sensors and actuators, are in part embodied as radio field devices. These have, as a rule, a radio unit and an electrical current source as integral components, wherein, through the electrical current source, an autarkic electrical current supply for the field device is enabled. So-called radio adapters, with which conventional field devices subsequently can be converted into radio field devices, have also become known.

SUMMARY OF THE INVENTION

An object of the invention is to provide an arrangement having at least one control unit and a plurality of field devices, which is distinguished by a reduction of the hardware components.

The object is achieved by associating with the control unit at least one interface having a connection element for accommodating a corresponding connection counterpart, wherein the connection counterpart is associable with an interface module, wherein associated with the interface module is a software protection system securing accessing to the field device, wherein the interface module permits communication between the corresponding field device and the superordinated control unit, wherein associated with the superordinated control unit is a software-protected processing program for the field device, and wherein the processing program is started or enabled via the software protection system, when the connection counterpart of the interface module of the field device is connected with the connection element of the control unit. What is meant in connection with the invention by the term "field devices" is presented at length above. A special embodiment of a field device, which is preferably employed in connection with the present invention, includes an inductive interface, and is available and sold in different embodiments by the Endress+Hauser Group under the mark, MEMOSENS. Different embodiments of the corresponding technology are described in EP 1 206 012 B1. The disclosure of this patent is explicitly incorporated here by reference.

The arrangement of the invention has the advantage that a reduction of the number of hardware components is possible in comparison to hitherto known solutions. Due to the arrangement of the invention, especially, both the number of interfaces as well as the components connected to these can be reduced. Compared to solutions, in the case of which the processing program is password protected, the solution of the invention has the advantage, that execution is simplified: It is not necessary to input a distinct password for the enabling of each field device.

The interface module, or the interface adapter, fulfills a double function according to the invention. On the one hand, it has a converter function for the purpose of assuring frictionless communication and converts the protocol used at the field level in the field device into the protocol used in the control unit. The same is true for conversion in the reverse direction. On the other hand, the interface module has the function of a copy protection device and assures that only allowed and authorized accessings of the field device occur. As soon as the interface module is connected to the control unit, the processing program assigned to the field device starts. For example, the measurement data transmitted by the field device are presented graphically on a display of the control unit; or parametering/configuring of the field device can be executed via the control unit.

For the case, in which a plurality of field devices are connected with the control unit, the processing program is embodied so as to be multiply instantiable; it thus includes a number of instances, wherein the number of instances corresponds at least to the number of field devices. The individual instances of the processing program are secured via a distinct software protection, which is unlocked virtually as soon as the corresponding field device is connected with the control unit via the interface module.

An advantageous further development of the arrangement of the invention provides that the superordinated control unit and the field devices communicate with one another via a hardwired connection or a wireless connection. In the case of a hardwired connection, in certain cases of application, it is sensible to provide also an extension cable between the connection counterpart and the connection element. In this way, the interface module can be arranged outside of the field level, whereby it is protected against damage due to mechanical effects or due to difficult environmental conditions on the field level.

While at the field level, communication occurs via one of the secure fieldbus protocols customary in automation technology—examples have already been named above—at the control level, where the control unit is located, the Ethernet protocol is preferably used. The advantages of Ethernet are its wide prevalence and high data transmission rates. Conversion between the two different protocols occurs in the interface module. Besides the protocols customary in automation technology, it is, of course, also possible to use at the field level proprietary protocols of the field device manufacturer.

The interface module is thus especially embodied as a converter unit, which converts the analog or digital signals made available by the field device into signals which are processable by the superordinated control unit. The transmitted signals preferably involve calibration data, maintenance and diagnostic data or measurement data.

The superordinated control unit is, for example, a PC, a PLC, a PLS, PCS (process control system), a DCS, a transmitter or a handheld servicing device.

In connection with the present invention, it is considered especially advantageous when the interface module with the corresponding software protection system is connected directly via a USB interface with the superordinated control unit, or via a USB hub. Via the USB hub, it is possible to connect any number of field devices with the control unit. Furthermore, the use of USB interfaces has the advantage that the interface module, or modules,—and, in given cases, the field device—is/are supplied with energy from the superordinated control unit via the USB interface. Alternatively, it is provided that each interface module is equipped with its own energy supply unit, e.g. a disposable battery.

In an advantageous further development of the arrangement of the invention, it is provided that each interface module has at least one Ex-barrier, which, as a function of a defined safety-critical application, is designed in such a manner, that the correspondingly required safety standard is fulfilled. Different embodiments of Ex-barriers as such are sufficiently known in automation technology and assure that only a limited, non-critical power is fed into the explosion hazard region.

An advantageous embodiment of the arrangement of the invention provides that, associated with the interface module is a test circuit, which checks the functionality of the field device. If, for example, the field device is equipped with an inductively or capacitively coupling interface—corresponding forms of embodiment are, for example, described in EP 1 206 012 B1—the test circuit then especially checks the maintaining of the correct transmission characteristics of data and energy via the interface. In general, the test circuit is embodied in such a way, that a checking of the hardware and/or software can be performed. In the case of a malfunction, a warning report is transmitted to the control unit.

An advantageous further development of the arrangement of the invention provides, moreover, that the interface module is embodied in such a manner, that at least two field devices are connectable simultaneously. In this way, it is enabled that, for calibration purposes, in addition to the actual field device, a reference field device for reviewing the measured values can be connected with the actual field device. Preferably, this solution is put to use in the case of field devices which are applied in the field of analysis for measuring conductivity, for pH measuring, etc.

A second variant of the invention, in the case of which likewise there is present a double function of the interface module or the interface adapter, has the following features: arrangement with a superordinated control unit and at least one intelligent field device connectable with the control unit, wherein associated with the control unit is at least one interface with a connection element for accommodating a corresponding connection counterpart, wherein the connection counterpart is associable with an interface module, or interface adapter, wherein the interface module is embodied in such a manner, that it permits communication between the corresponding field device and the superordinated control unit, and wherein associated with the interface module is at least one Ex-barrier, which, as a function of a defined safety-critical application, is designed in such manner, that the correspondingly required safety standard is fulfilled.

In an advantageous embodiment of this invention, associated with the interface module is a software protection system securing accessing of the field device, wherein associated with the superordinated control unit is a software-protected processing program for the field device, and wherein the processing program is started or enabled via the software protection system, when the connection counterpart of the interface module of the field device is connected with the connection element of the control unit.

The first variant of the invention protects the double-function, interface module/software protection. All advantageous further developments described for this first solution of the invention correspondingly also hold for the second variant of the invention, which protects the double-function, interface module/Ex protection.

BRIEF DESCRIPTION OF THE DRAWINGS

The invention will now be explained in greater detail on the basis of the appended drawing, the figures of which show as follows:

FIG. 1 is an advantageous embodiment of the arrangement of the invention; and

FIG. 2 is a second advantageous embodiment of the arrangement of the invention.

DETAILED DISCUSSION IN CONJUNCTION WITH THE DRAWINGS

FIG. 1 shows an advantageous embodiment of the arrangement of the invention. The arrangement of the invention is composed of a superordinated control unit 1 and a plurality of intelligent field devices F1, F2, . . . , Fn connectable with the control unit 1. The arrangement of the invention can, of course, also be composed of a control unit and one field device. Associated with the control unit 1 is at least one interface 2. If a number of interfaces 2.1, 2.2, . . . 2.n are required, the superordinated control unit 1 then either possesses a corresponding number of interfaces 2.1, 2.2, . . . 2.n, or at least one hub 9 is interposed. A corresponding embodiment is to be seen in FIG. 2.

Preferably, each interface 2.1, 2.2, . . . , 2.n is externally accessible and includes a connection element 3.1, 3.2, . . . , 3.n for accommodating a corresponding connection counterpart 4.1, 4.2, . . . , 4.n. The connection counterpart 4.1, 4.2, . . . , 4.n is associable with an interface module 5.1, 5.2, ..., 5.*n*, which, moreover, has a software protection system 6.1, 6.2, ..., 6.*n* securing accessing of the field device F1, F2, ..., Fn. The interface module, on the one hand, assures the conversion between the different protocols at the field level and at the control level, and, on the other hand, has the function of a copy protection device. To support this, there is implemented in the superordinated control unit 1 a software-protected processing program B1, B2, ..., Bn for the particular field device F1, F2, ..., Fn. The processing program B1, B2, ..., Bn is, in the case of connecting a plurality of field devices F1, F2, ..., Fn, multiply instantiable. Via the software protection system (6.1, 6.2, ..., 6.*n*), the processing program B1, B2, ..., Bn is started or enabled as soon as the connection counterpart 4.1, 4.2, ..., 4.*n* of the interface module 5.1, 5.2, ..., 5.*n* of the associated field device F1, F2, ..., Fn is connected with the connection element 3.1, 3.2, ..., 3.*n* of the control unit 1.

In order that the field devices F1, F2, ..., Fn can be used without problem in an explosion hazard area, associated with the interface module 5.1, 5.2, ..., 5.*n* is furthermore an Ex-barrier 8.1, 8.2, ..., 8.*n*. The Ex-barrier 8.1, 8.2, ..., 8.*n* is designed in such a manner, that the field device F1, F2, ..., Fn meets the particular safety requirements in force. It assures that only a predetermined allowed power gets into in the explosion hazard area.

In FIG. 2 is furthermore provided an extension cable 7, which permits the interface module 5 to be arranged, for example, outside of the field level.

The invention claimed is:

1. An arrangement with a superordinated control unit and at least one intelligent field device connectable with said control unit, wherein:
    associated with said control unit is at least one interface with a connection element for accommodating a corresponding connection counterpart;
    said connection counterpart is associable with an interface module;
    associated with said interface module is a software protection system securing accessing of said at least one intelligent field device;
    said interface module permits communication between said at least one intelligent corresponding field device and said superordinated control unit,
    associated with said superordinated control unit is a software-protected processing program for said at least one intelligent field device;
    said processing program is started or enabled via said software protection system, when said connection counterpart of said interface module of said at least one intelligent field device is connected with said connection element of said control unit;
    in case of a plurality of said at least one intelligent field devices connectable with said control unit said processing program has a plurality of instances;
    each instance of said processing program is, via said corresponding software protection system, uniquely associated with one of said at least one intelligent field devices; and
    the individual instances of the processing program are secured via a distinct software protection, which is unlocked virtually as soon as the corresponding field device is connected with the control unit via the interface module.

2. The arrangement as claimed in claim 1, wherein:
    said superordinated control unit and said at least one intelligent field devices communicate with one another via a hardwired connection or a wireless radio connection.

3. The arrangement as claimed in claim 1, wherein:
    communication between said at least one intelligent field devices and said superordinated control unit occurs at field level by means of a transmission protocol customary in automation technology and at control unit level by means of WAN Wide Area Network) or LAN (Local Area Netwrok) or W-LAN (Wireless Local Area Network).

4. The arrangement as claimed in claim 1, wherein:
    said interface module is embodied as a converter unit, which converts analog or digital signals made available by said at least one intelligent field device into signals which are processable by said superordinated control unit.

5. The arrangement as claimed in claim 1, wherein:
    said superordinated control unit is, for example, a PC (Personal Computer), a PLC (Programmable Logic Controller), a PCS Process Control System), a DCS (Distributed Control System), a transmitter or a handheld servicing device.

6. The arrangement as claimed in claim 1, wherein:
    said interface module is connected via a USB Universal Serial Bus) interface with said superordinated control unit directly, or via a USB hub.

7. The arrangement as claimed in claim 6, wherein:
    in case of use of a USB interface, said interface module is supplied with energy by said superordinated control unit via said USB interface, or wherein, in case of use of other interfaces, there is associated with said interface module, in given cases, in each case, an energy supply unit.

8. The arrangement as claimed in claim 1, wherein:
    said interface module has at least one Ex-barrier, which, as a function of a defined safety-critical application, is designed in such a manner, that the correspondingly required safety standard is fulfilled.

9. The arrangement as claimed in claim 1, wherein:
    associated with said interface module is a test circuit, which checks functionality of said at least field device.

10. The arrangement as claimed in claim 1, wherein:
    said interface module is embodied in such a manner, that at least two field devices are connectable simultaneously.

11. The arrangement as claimed in claim 4, wherein:
    by means of digital and/or analog signals, calibration data, maintenance data or diagnostic data or measurement data are exchanged between said at least one intelligent field devices and said control unit.

* * * * *